United States Patent [19]
Chen et al.

[11] Patent Number: 6,074,087
[45] Date of Patent: Jun. 13, 2000

[54] NON-CONTACT METHOD FOR MEASURING THE SURFACE TEMPERATURE DISTRIBUTION OF A MELT DURING GROWTH OF IONIC CRYSTALS

[75] Inventors: Jyh-Chen Chen; Chieh Hu; Yeou-Chang Lee, all of Taoyuan Hsien, Taiwan

[73] Assignee: National Security Council, Taipei, Taiwan

[21] Appl. No.: 09/042,127

[22] Filed: Mar. 13, 1998

[30] Foreign Application Priority Data

Sep. 4, 1997 [CN] China ................................ 86112758

[51] Int. Cl.$^7$ ................................ G01J 5/06; G01J 5/10; G01K 3/06
[52] U.S. Cl. ........................ 374/129; 374/121; 374/124; 374/127
[58] Field of Search .................... 374/124, 126, 374/127, 128, 129, 137, 121

[56] References Cited

U.S. PATENT DOCUMENTS

| | | | |
|---|---|---|---|
| 4,020,695 | 5/1977 | Roney | 374/127 |
| 4,193,302 | 3/1980 | Nixon | 374/124 |
| 4,465,382 | 8/1984 | Iuchi et al. | 374/9 |
| 4,840,496 | 6/1989 | Elleman et al. | 374/124 |
| 4,883,364 | 11/1989 | Astheimer | 374/129 |
| 4,924,478 | 5/1990 | Tank | 374/121 |
| 5,021,980 | 6/1991 | Poenisch et al. | 702/134 |
| 5,154,512 | 10/1992 | Schietinger et al. | 374/9 |
| 5,186,541 | 2/1993 | Paulk | 374/124 |
| 5,208,643 | 5/1993 | Fair | 356/43 |
| 5,226,732 | 7/1993 | Nakos et al. | 374/133 |
| 5,318,362 | 6/1994 | Schietinger et al. | 374/142 |
| 5,326,173 | 7/1994 | Evans et al. | 374/128 |
| 5,377,126 | 12/1994 | Flik et al. | 364/528.35 |
| 5,501,637 | 3/1996 | Duncan et al. | 374/126 |
| 5,601,366 | 2/1997 | Paranjpe | 374/126 |

FOREIGN PATENT DOCUMENTS

| | | | |
|---|---|---|---|
| 58-168927 | 10/1993 | Japan | 374/127 |
| 2084717 | 4/1982 | United Kingdom | 374/121 |

OTHER PUBLICATIONS

J.C. Sturm, P.V. Schwartz, and P.M. Garone; "Silicon temperature measurement by infrared transmission for rapid thermal processing applications", *Appl. Phys. Lett.;* Mar. 5, 1990; pp. 961–963.

D.O. Nason, C.T. Yen and W.A. Tiller; "Measurements of Optical Properties of some Molten Oxides"; *J. Crystal Growth;* 1990; vol. 106, pp. 221–226.

D.O. Nason, C.T. Yen, R.S. Feigelson, and W.A. Tiller; "A high spatial resolution optical pyrometer"; *Rev. Sci. Instrum.; Mar. 1990;* pp. 1024–1028.

P.J. Timans; "The experimental determination of the temperature dependence of the total emissivity of GaAs using a new temperature measurement technique"; *J. Appl. Phys.;* Jul. 15, 1992; pp. 660–670.

Pollack and Hickel, "Surface Temperature Mapping with Infrared Photographic Pyrometry", NASA Tech Brief 69–10113 (2 pages), Jun. 1969.

*Primary Examiner*—Diego Gutierrez
*Assistant Examiner*—Stanley J. Pruchnic, Jr.
*Attorney, Agent, or Firm*—Merchant & Gould P.C.

[57] ABSTRACT

The subject invention relates to a technique employing a calibrated thermal radiometer, and the radiation characteristics of ionic crystals to measure the temperature distribution of crystals during crystal growth. When in high temperature, the ionic crystals often exhibit a transparent region having low reflectance, and low absorption in the spectrum between the short-wavelength absorption edge and the long-wavelength absorption edge. In addition, these crystals have an opaque spectral region having low reflectance and high absorption, i.e. have surface radiation of high emissivity when the spectrum is in the range between the long-wavelength absorption edge and the onset of the Reststrahlen band. The spectral emissivity of the ionic crystal may not change significantly with a variation of temperature in this opaque region. According to Planck's law, the surface temperature distribution during crystal growth can be obtained after the surface radiation of the opaque region is detected, and the emissivity at the melting point is calculated.

9 Claims, 7 Drawing Sheets

NON-CONTACT METHOD FOR MEASURING THE SURFACE TEMPERATURE DISTRIBUTION OF A MELT DURING GROWTH OF IONIC CRYSTALS

FIELD OF THE INVENTION

The present invention relates to a method for measuring the surface temperature of ionic crystals and in particular, to a non-contact method for measuring the surface temperature distribution of the ionic crystals, such as $Al_2O_3$, MgO, $LiNbO_3$, $BaTiO_3$, $Bi_{12}SiO_{20}$ and LiF, during crystal growth.

DESCRIPTION OF THE RELATED ART

In the present field of electro-optical development, ionic crystals play a significant role as being the prerequisites of electro-optical elements. It follows that the growth of the ionic crystals should be taken as the first consideration in the development of ionic crystals. Therefore, the knowledge of the parameters which affect the crystal growth will help improve the quality of crystal growth, thereby obtaining excellent electro-optical products.

In light of the high temperature during crystal growth and the requirement of localized measurement of temperature, the conventional temperature measurement method utilizing thermocouples to be in direct contact with articles has failed to comply with the requirement for crystal growth. Particularly, a considerable error from the measurement of minute crystals as well as a thin film and epitaxy will be caused by means of such conventional technique. The technique of temperature measurement which employs the thermal radiation concept by means of non-contact pyrometry has been extensively researched in recent years. In the development of semiconductor, the non-contact technique for measuring temperature can be exactly applied to the manufacturing process of integrated circuit as well as the growth process of electro-optical crystals. With respect to the closed manufacturing system, the utilization of optical property to measure thermal radiation avoids interfering with the articles to be measured. However, the utilization of pyrometry which employs thermal radiation concepts has its problems due to the fact that during the process of measurement, the radiation properties of materials, such as emissivity, reflectivity and transmissivity, should be obtained, and these properties may be affected by the variation in dimension, structure, wavelength and temperature. Accordingly, different methods for measuring temperature exist with respect to different measuring conditions and requirements.

There are not many researches on the application of non-contact method to crystal growth at present. Sturm et. al (Appl. Phys. Lett. 56, 961–963, 1990) has established the relation of optical properties and temperature for the growth of silicon single crystal having a large dimension with respect to different systems and measurements, and then calculated the temperature of materials by the measured optical properties. Such technology, however, have to utilize laser beams on the material rod and to receive reflective energy by a thermal radiometer and calculate reflectivity. The magnitude of emissivity $\epsilon$ ($\epsilon=1-\rho, \rho$: reflectivity) in light of an opaque material can thus be obtained. After the emissivity is obtained by means of the specific laser wavelength, the temperature distribution can thus be obtained by means of the laser having an identical wavelength. Nason et. al (J. Crystal Growth 106, 221–226, 1990) utilized a similar method to measure the temperature distribution of crystals of minute diameters which are grown from the technique of Laser-Heated Pedestal Growth (LHPG) except that the transmissivity with respect to the transparent materials is required to be considered additionally so as to obtain emissivity. The above-mentioned techniques are directed to single-point temperature measurement, in which the measured temperature does not come out at the same time. In addition, since the measuring device has to be moved to obtain the temperatures at different locations of the article to be measured and it is required to measure the normal reflectivity, the relative position of the thermal radiometer and the article to be measured has to be extremely accurate; otherwise, the measured reflection will be erroneous. Particularly, when the article to be measured changes in its melt zone shape, the accuracy of the measurement for temperature would then be affected. As to the temperature measurement for a thin film and epitaxy, the magnitude of emissivity is required to be calculated as well. According to U.S. Pat. No. 5,501,637, a thin film is measured by utilizing an ellipsometer to measure the optical constant and the thickness of the thin film so as to obtain material reflectivity and transmissivity and further determine the absorptivity. Finally, the temperature can thus be measured by receiving emitted thermal radiation intensity by means of pyrometer. According to U.S. Pat. No. 5,377,126, the thickness of the thin film is calculated by the duration of epitaxy or by an interferometer. The measurement of temperature is therefor to obtain the temperature of the blackbody by attending to the correction of the blackbody. Then, the actual temperature is thus obtained by means of emissivity. The above-mentioned methods have to depend upon the extra equipment to obtain the emissivity of an article to be measured and subsequently calculate the temperature thereof. It follows that the repeated measurements cause a burden in measurement and an inaccuracy in the calculation of emissivity.

It is therefore a target for the developers of crystal growth to provide a non-contact technique for measuring surface temperature of ionic crystals which eliminates the restriction or disadvantage that accompanies the conventional techniques, has low costs and possesses commercial magnitude. Accordingly, a novel non-contact technique for measuring surface temperature of ionic crystals is provided by the present invention as described hereinafter.

SUMMARY OF THE INVENTION

A primary objective of the present invention is to provide a non-contact method for measuring surface temperature of ionic crystals, in which during crystal growth in high temperature, the material itself is able to emit energy. In case that the radiation intensity with a specific wavelength and the melting point are known, the emissivity can thus be obtained after the emitted radiation and blackbody radiation intensity at the melting point are measured. Under the condition of the emissivity which does not vary according to temperature, the distribution of temperature thereof can be obtained by means of Planck's Law, thereby almost all of the ionic crystals can be measured with such a technique.

Another objective of the present invention is to provide a non-contact method for measuring surface temperature of ionic crystals, which employs a thermal radiometer to detect the thermal radiation phenomenon (i.e. to obtain emissivity from the known thermal radiation intensity) during the growth of ionic crystals which have specific optical properties, and then to obtain the temperature at the solid-melt boundary of the ionic crystal during crystal growth so as to detect the temperature distribution thereof, thereby there is no need to predetermine the optical properties (e.g.

refractive index) of the material to be measured and to provide additional light sources and receivers during the temperature measurement.

Another objective of the present invention is to provide a non-contact method for measuring surface temperature of ionic crystals, which completely receives the emitted intensity of the material itself to measure temperature therefor, thereby reducing probable error and fact analyzing results.

DETAILED DESCRIPTION OF THE PREFERRED EMBODIMENT

Description of the Invention

Figure 1:
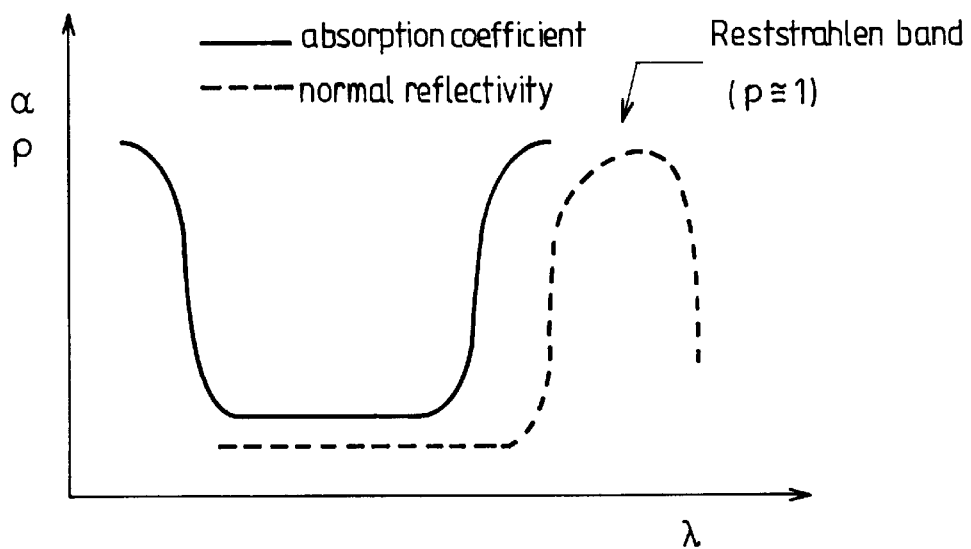
FIG. 1 is a schematic view showing the reflecting and absorbing properties of the spectrum of an ionic crystal under room temperature.

A solid generally comprises three types, namely, a conductor, a semiconductor and an insulator. Because movement of electrons for different wavelengths tends to cause continuous absorption and emission, an electric conductor involves the radiation which has high absorption coefficient and high reflectance. The radiation properties of such a type of material mainly result from the surface properties thereof. An insulator belongs to the class of a semitransparent substance of which many of ionic crystals have the properties. The ionic crystals often exhibit high transparent region between the short-wavelength absorption edge and the long-wavelength absorption edge. The intense absorption property of the short-wavelength edge is caused by capturing the photons in valence bands and promoting them to the conduction bands, while the intense absorption property of the long-wavelength edge is caused by capturing the photons by means of crystal lattice oscillation. Furthermore, at room temperature, the spectrum reflective property of such type of ionic crystals involves a high reflective region which is so called Reststrahlen band. The edge of this high reflective band is positioned at two times the wavelength of the long-wavelength edge, as shown in FIG. 1. Therefore, ionic crystals exhibit surface radiation phenomenon for some wavelengths and exhibit body radiation phenomenon for other wavelengths. However, such wavelengths fall within the range of the near infrared ray and visible ray, i.e. the range of wavelengths with intense radiation between 1000° C. and 2000° C., and therefore can be detected in order to realize the physical properties thereof. According to the above, it is known that when growing at high temperature, the ionic crystals often exhibit transparent region having low reflectance and low absorption in the spectrum between the short-wavelength absorption edge and the long-wavelength absorption edge, and have opaque region having low reflectance and high absorption i.e. having high emissivity in the spectrum between another long-wave-length absorption edge and the onset of the Reststrahlen band.

Figure 2:
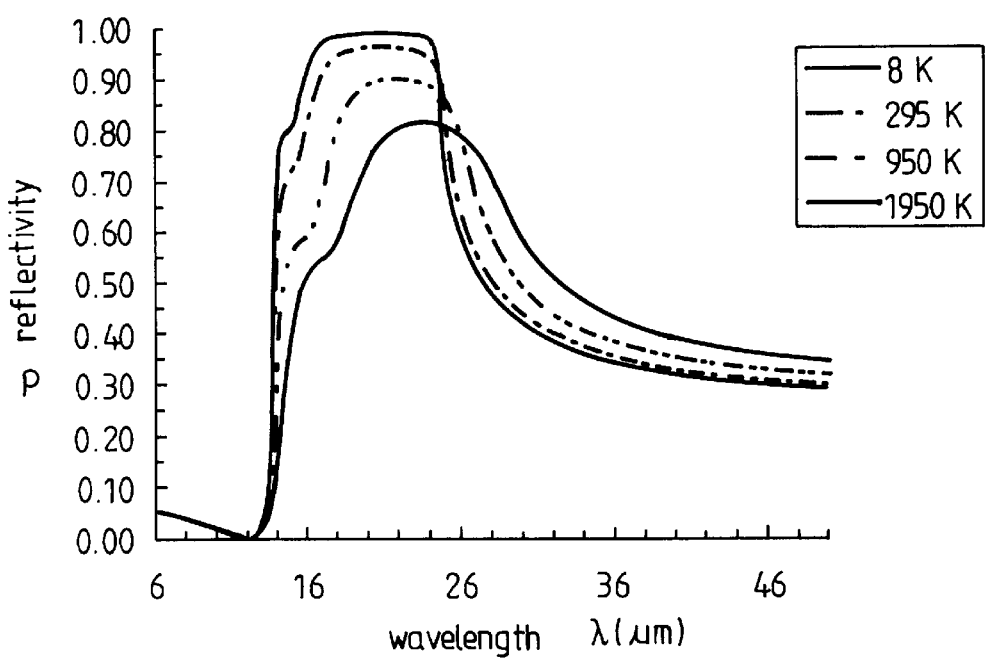
FIG. 2 is a schematic view showing MgO spectrum reflectivity distribution which varies with temperature.
Figure 3:
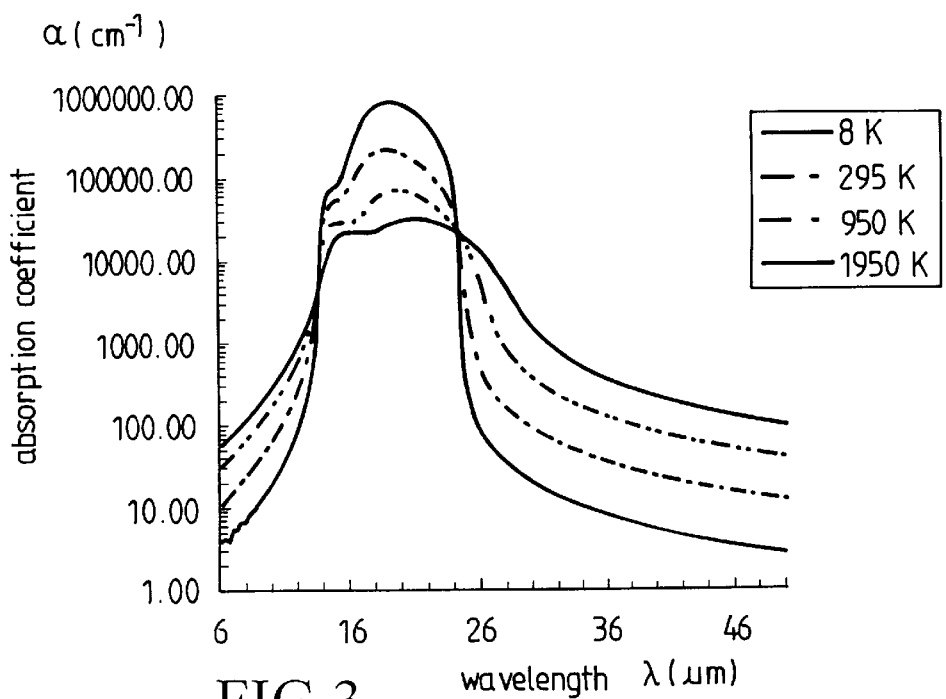
FIG. 3 is a schematic view showing MgO spectrum absorption coefficient which varies with temperature.

With respect to the ionic crystals, the crystal lattice resonance frequency shifts toward the higher-magnitude wavelength, and the plasma frequency and damping factor of the oscillator increase with an increase of temperature, thereby the high reflectivity region adjacent to that of the crystal lattice resonance frequency moves to the higher-magnitude wavelength, and the reflectivity and absorption coefficient decreases. Similarly, the low reflective regions at the two edges of the high reflective band move toward the regions having longer wavelengths. The reflectivity of low reflective region having a short wavelength does not vary with the change of temperature, and the absorption coefficient increases abruptly with an increase of temperature. FIG. 2 shows MgO spectrum reflectivity distribution which varies with temperature. FIG. 3 shows MgO spectrum absorption coefficient which varies with temperature. FIGS. 2 and 3 are quoted from "Phys. Rev. Vol. 146 (1966), Pages 526–542". A material that has an optical thickness greater than 10 will be regarded as an opaque substance. It follows that if a material is opaque at room temperature, higher temperature will cause the material to be more opaque and to have surface emitted radiation. It may thus be conjectured that the emissivity hardly varies with temperature, which is helpful in obtaining the temperature distribution of a substance surface through the precise measurement of thermal radiation intensity. The infrared thermal radiometer can be utilized to record the long-wavelength opaque surface radiation and to measure the emitted intensity at the melting point, by referring to the blackbody radiation intensity at the melting point, to calculate the emissivity. Since the emissivity hardly varies with temperature, the surface temperature distribution of the ionic crystals can thus be obtained according to Planck's law. The present invention is to employ the specific optical property performed by ionic crystals to detect the thermal radiation during the growth of crystals by means of a thermal radiometer and finally to obtain the temperature distribution during crystal growth.

The claimed non-contact method for measuring surface temperature of ionic crystals relates to a technique for measuring the surface temperature of ionic crystals during their growth, comprising the steps of:

a. melting the crystal material by a heat source to form a solid coexistent with melt;

b. receiving surface thermal radiation intensity for specific wavelengths with respect to the material to be measured;

c. obtaining thermal radiation intensity at a solid-melt-gas interface at melting point and dividing it by a blackbody radiation intensity at the same temperature to obtain an emissivity at the melting point; and d. converting the surface thermal radiation intensity to a surface temperature distribution by referring to the emissivity and thermal radiation intensity as obtained from Steps c and b, respectively.

As mentioned above, at high temperature, the ionic crystal exhibits a transparent region of low reflectance and low absorption in the spectrum between the short-wavelength absorption edge and high-wavelength absorption edge and exhibits an opaque region of low reflectance and high absorption in the spectrum between the long-wave-length absorption edge and the onset of Reststrahlen bands. The thermal radiation intensity in Step b. is measured by continuously receiving the surface radiation of the material using a thermal radiometer. The solid-melt-gas interface in Step c can be at the position where the maximum thermal radiation of the transparent region having low reflectance and low absorption in the axial direction occurs. The position of this solid-melt-gas interface can be alternatively determined by analyzing the melt zone shape, while the melt zone shape is determined by utilizing the feature of the difference between the material radiation intensity and the circumferential environment. In this step, the radiation intensity at the melting point for a specific time can be obtained. The blackbody radiation intensity thus can be obtained by using the known radiation intensity at the melting point according to Planck's law.

Functions

The visible virtual crystal growth systems, such as a floating zone method and a Bridgeman growth method, all utilize the capture of thermal radiation to measure the solid and melt radiation distribution for the material in the system. The present invention can be employed to measure the temperature of material in the case that the applied material exhibits an opaque region of low reflectance and high absorption and the emissivity does not change with a variation of temperature. The present invention so far is applied to a variety of ionic crystals, such as $LiNbO_3$, $BaTiO_3$, $Bi_{12}SiO_{20}$ and LiF crystals.

Detailed Descriptions of the Example

The following example utilizes the crystal fiber growth equipment of the Laser Heated Pedestal Growth (LHPG) method to melt $LiNbO_3$ in explanation of the present invention.

The LHPG equipment is composed of a $CO_2$ laser beam source (produced by Edinburgh, Inc. England, Model No. PL5), an optical assembly system for conversion of light-heat sources and an infrared thermal imaging radiometer. The thermal radiation which is measured by means of the infrared thermal imaging radiometer can be converted through different filter lens to respectively detect the radiation for wavelengths of 3–5 μm, 8–12 μm, 5 μm and 10.6 μm (the 760 Series of the measuring system produced by Inframetrics Inc. can be utilized for measurement, in which the measuring speed can be up to 50 Hz). In order to improve the spatial resolution during measurement, a 3X telescope and close-up lens can be added in front of the lens of the radiometer. The images recorded by the thermal radiation can be converted to be shown on the display of a computer and the relative images thereof can be dealt with by image cards. These images can be saved as a imaging format. In order for the information obtained from the thermal radiation be dealt with by the computer, software can be employed to convert the image format into a recognizable text file. Also, in order to reduce the noise generated during measurement, a spatial domain low pass filter can be employed to cut off the signal frequency over 75 Hz.

Figure 4:
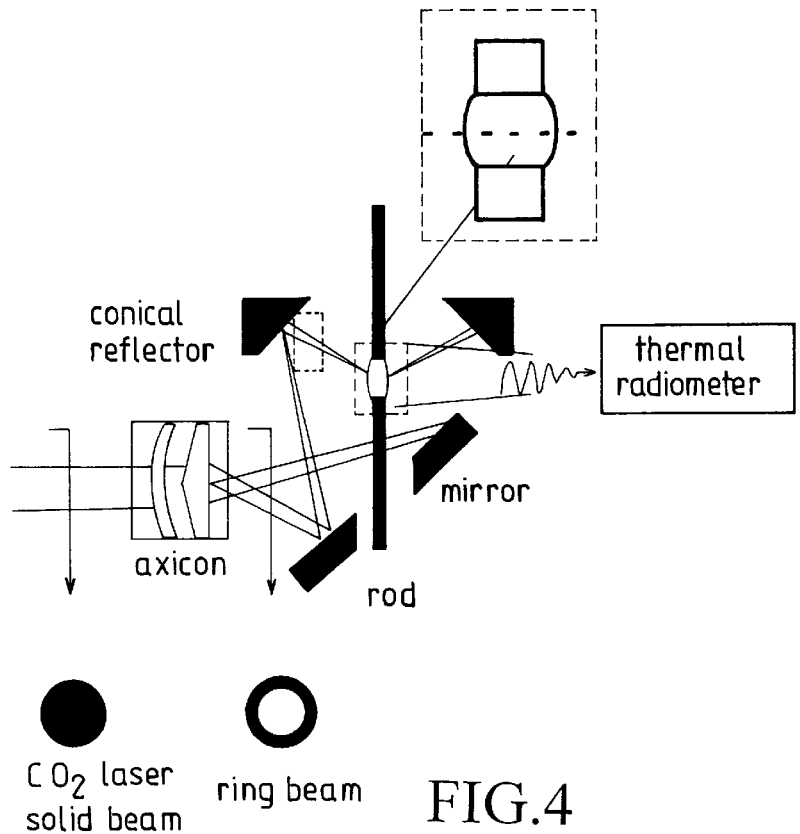
FIG. 4 is a schematic view showing the path of converting the $CO_2$ laser solid beam to a ring beam as well as the relative position of the lens.
Figure 5:
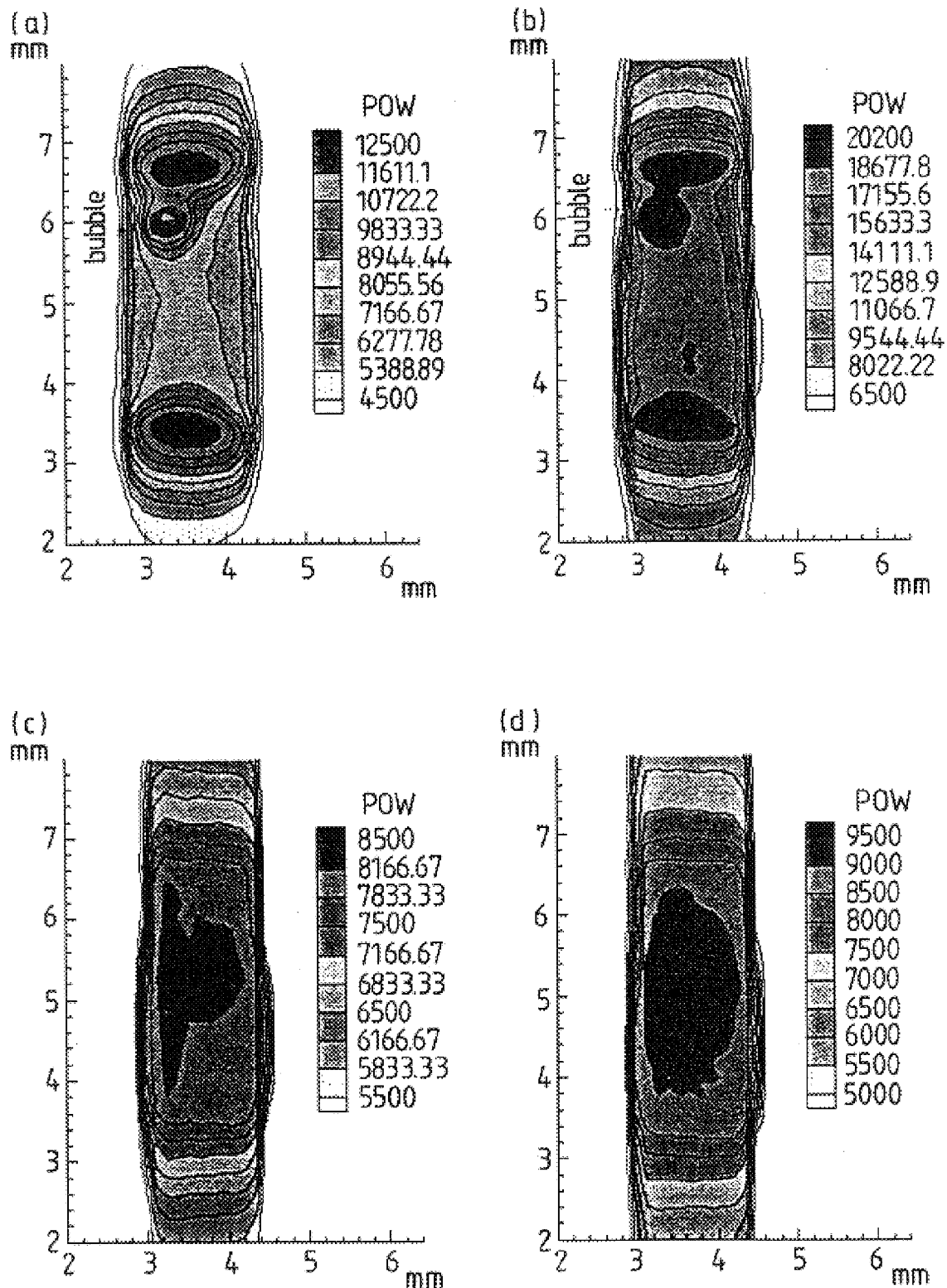
FIG. 5 is two-dimensional equiradiation images of the $LiNbO_3$ polycrystalline rod material which is recorded by a scanning thermal radiometer, in which the rod has a diameter of 1.5 mm and the laser power is 900 mW for wavelengths of (a) 3–5 $\mu$m, (b) 5 $\mu$m, (c) 10.6 $\mu$m and (d) 8–12 $\mu$m.

FIG. 4 illustrates the arrangement of the whole equipment. A $CO_2$ laser beam passes through a conical lens to convert into a ring-shaped laser beam, and then passes through a 45° reflector and a conical lens to focus on a material rod. In the meantime, the thermal radiometer is utilized to normally record the two-dimensional thermal radiation distribution as shown in FIG. 5. The following linear scan analysis is obtained by adopting the analysis from the two dimensional radiation distribution in its axial direction. Accordingly, if the magnitude of the radiation of solid is different from that of melt, such a difference can be judged from the distribution of the linear scanning curves.

As to all of the polycrystalline rods (which include $LiNbO_3$, $BaTiO_3$, $Bi_{12}SiO_{20}$ and LiF crystals), they are obtained by a ceramic manufacturing process, in which powder is pressed to a block shape, then sintered in a high temperature furnace and finally cut and ground to a rod having a cylindrical shape.

a. Thermal radiation analysis

When the material rod is ready for use, it can be put in the system and gradually heated to melt by increasing laser power. FIG. 5 is two-dimensional equiradiation images of the $LiNbO_3$ rod material which is recorded by a scanning thermal radiometer under the laser power of 900 mW. For the wavelengths of 3–5 μm and 5 μm, due to the presence of transparent phenomenon, the radiation intensity of solid is greater than that of melt when the temperature is approaching the melting point. When the melt zone is melted completely, the possible shape and position of the solid-melt interface can be observed in the images. For the wavelengths of 10.6 μm and 8–12 μm, due to the presence of surface radiation property, the radiation intensity depends upon the surface temperature. It follows that the radiation intensity at the core of the melt zone is almost unchanged. Whether it is uniformly heated can be directly observed in view of the equiradiation images. In addition, since the generated bubbles do not affect the radiation intensity for the wavelengths of 10.6 μm and 8–12 μm, the surface radiation property for these wavelengths can thus definitely be determined.

Figure 6:
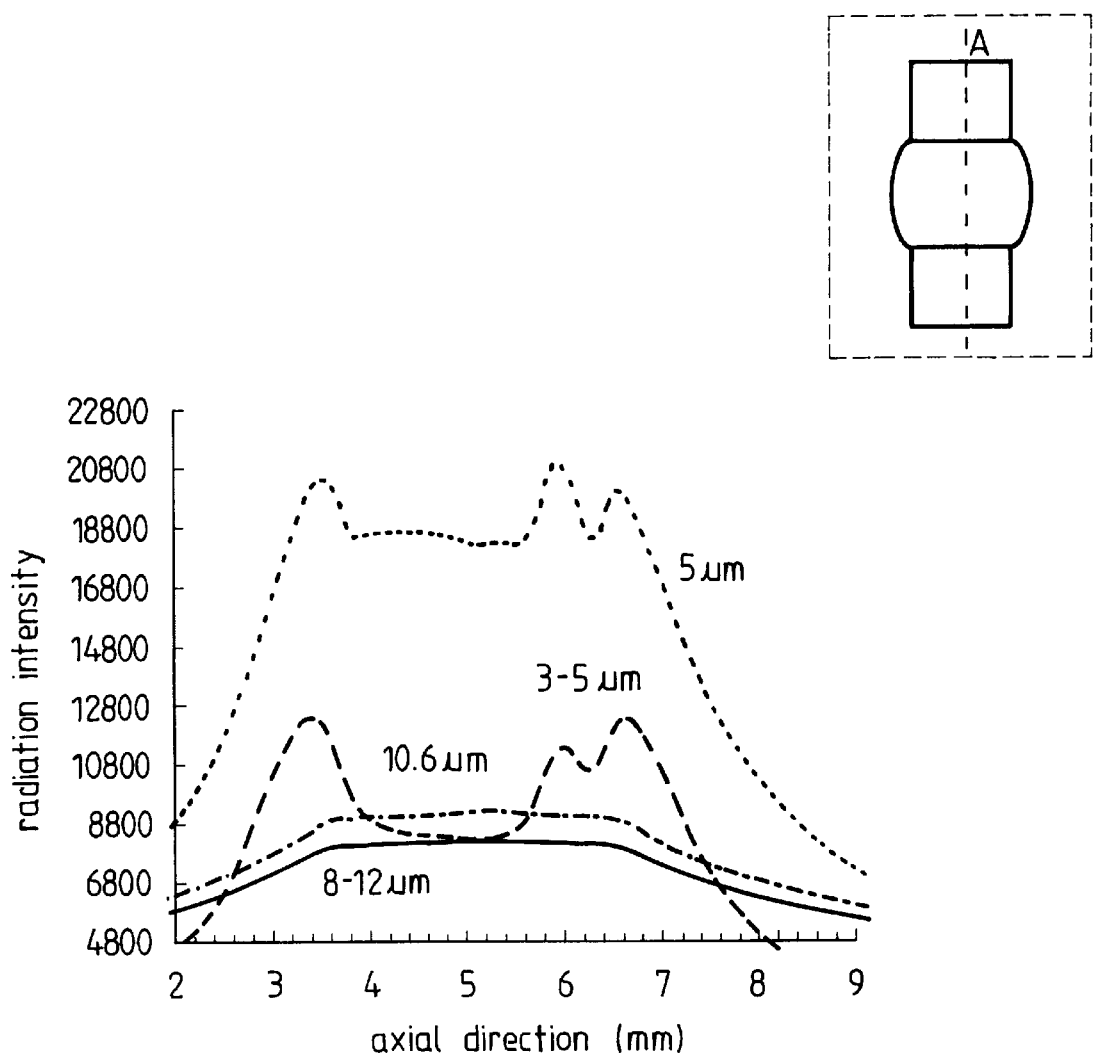
FIG. 6 is a schematic view showing the distribution of thermal radiation as a function of vertical position after the polycrystalline rod as shown in FIG. 5 is melted.

FIG. 6 is a schematic view showing the distribution of thermal radiation in a vertical direction along the center line of the axis of the material rod after the polycrystalline rod, as shown in FIG. 5, is melted. When the material is completely melted to form a melt zone, the radiation intensity for the wavelengths of 3–5 μm and 5 μm significantly decreases. Apparently, solid and melt have different emissivity. Under the circumstances, the radiation intensity presents two peak magnitudes, at which the solid-melt-gas triple point is located. For the wavelengths of 10.6 μm and 8–12 μm, when the material is gradually being melted, the distribution of radiation in the heating zone becomes even. According to the surface radiation phenomenon, the radiation intensity for the wavelengths of 10.6 μm and 8–12 μm is primarily relative to the surface temperature. When the melt zone is formed, due to the strong thermocapillary convection effect, the heat is diffused from the core of the surface of the melt zone to a lower temperature zone, thereby causing the even distribution of the radiation in the heating zone.

Figure 7:
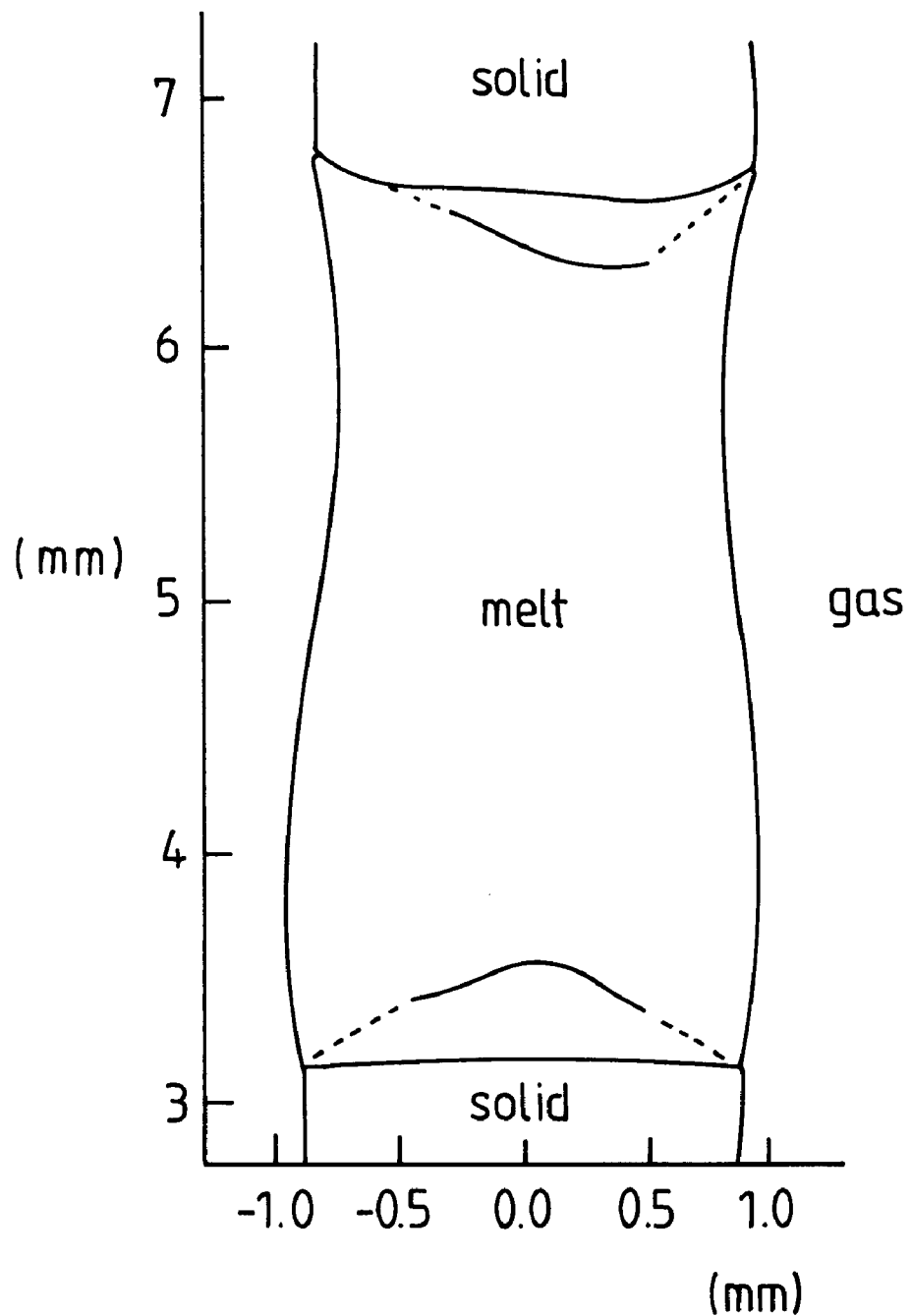
FIG. 7 is a diagram showing melt-zone shape of the $LiNbO_3$ polycrystalline rod having a diameter of 1.66 mm for a laser power of 10.2 W.

During the observation of the melting of the material rod by means of a thermal radiometer, because the heated article exists in background radiation at room temperature, the shape of the heated article can be naturally presented in the thermal images by readily realizing the corresponding radiation relation therebetween. The above concept is utilized in FIG. 7 to show a melt-zone shape of the $LiNbO_3$ polycrystalline rod having a diameter of 1.66 mm for a laser power of 10.2 W. In this figure, it is found that after the material has melted, the shape at melt-gas interface and solid-gas interface are apparently different in curvature, thereby the location of the solid-melt-gas zone shape can clearly be identified. The radiation energy at the melting point can thus be obtained by measuring the radiation energy at the location of the solid-melt-gas zone shape. Such knowledge of radiation energy will help the subsequent temperature measurement.

b. Surface temperature distribution of solid region and melt region

Figure 8:
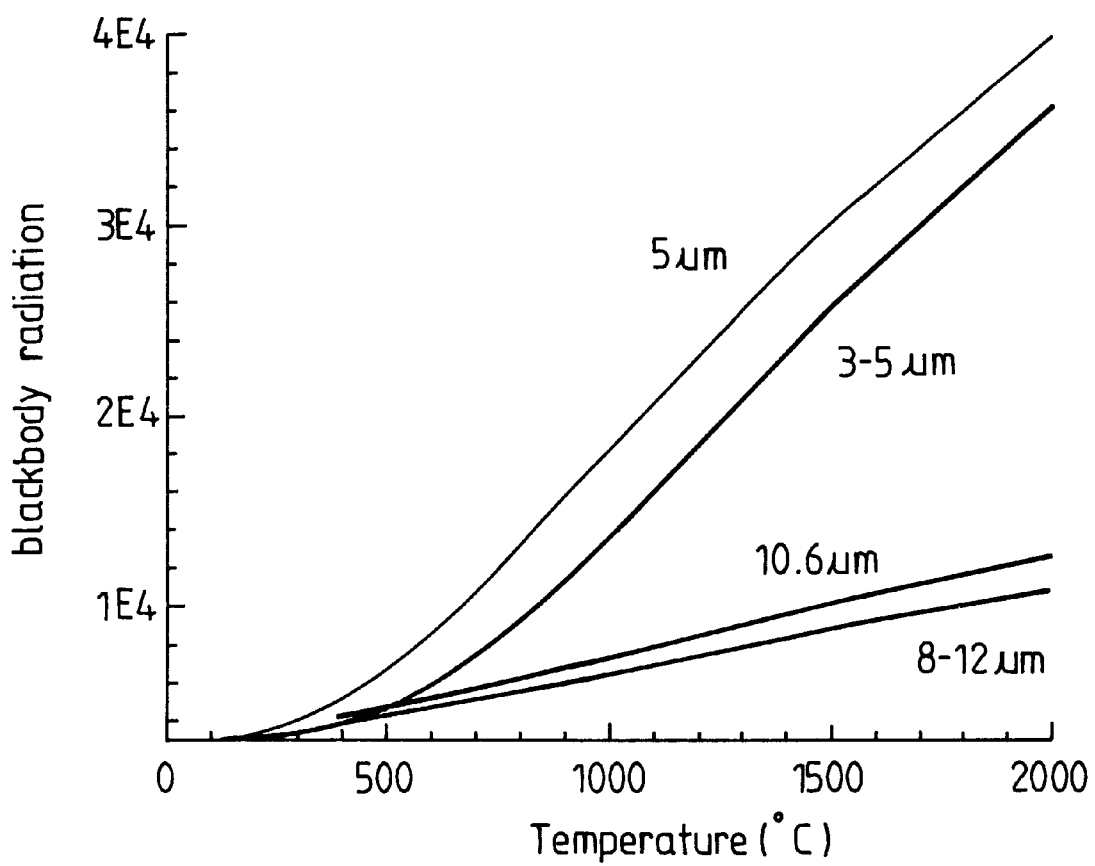
FIG. 8 is a diagram showing the blackbody intensity as a function of temperature for different wavelengths.
Figure 9:
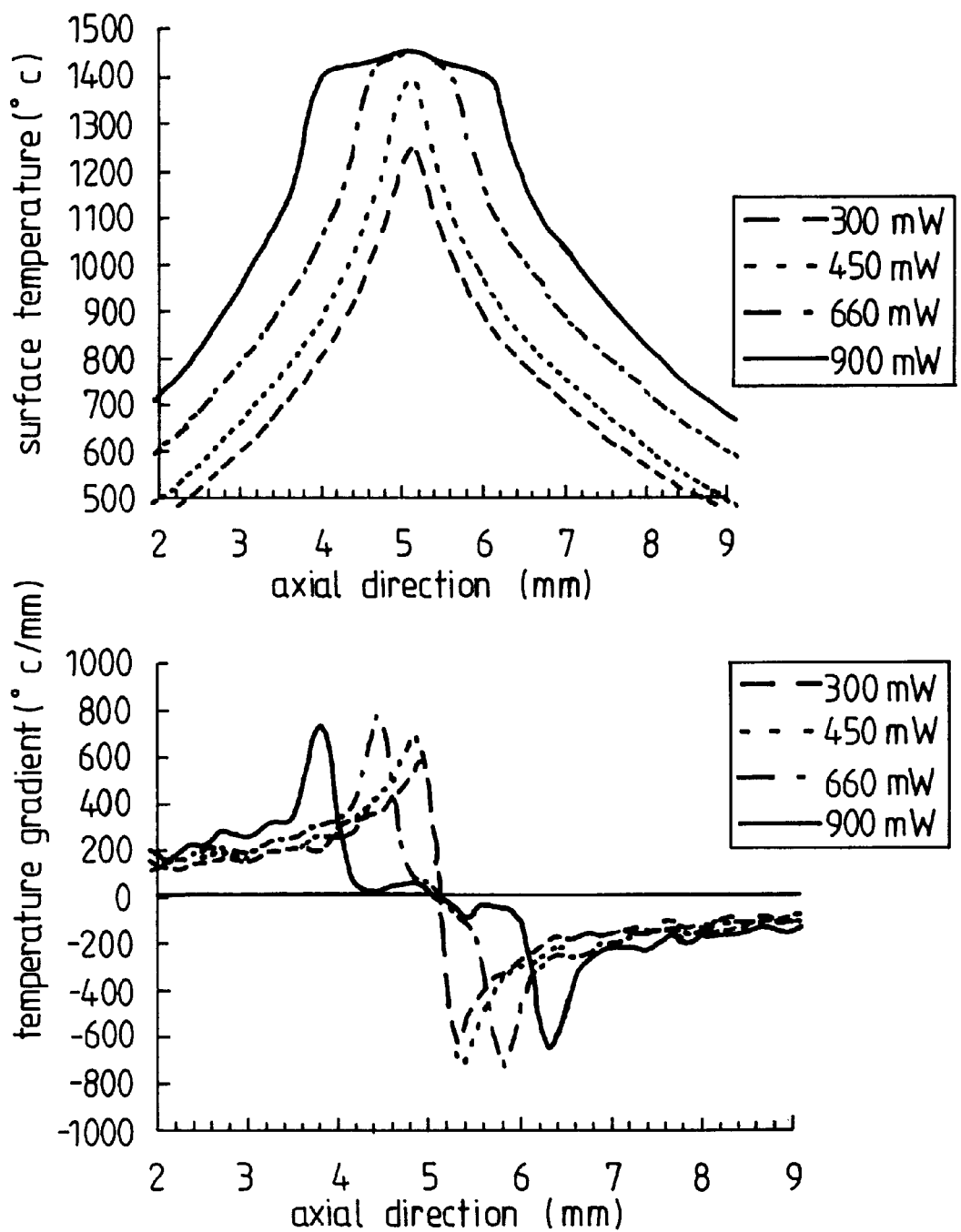
FIG. 9 is a diagram showing the distribution of surface temperature of the $LiNbO_3$ polycrystalline rod in an axial direction, and the temperature gradient thereof as a function of vertical positions.

Since the thermal radiation property for the wavelength of 10.6 μm is directed to surface radiation phenomenon, the radiation intensity to be measured is unlikely to be affected by the laser beam (9.2 μm). As long as the emissivity is known, the magnitude of the thermal radiation can be employed to obtain the magnitude of the surface temperature according to Planck's law. In an infrared thermal radiometer, an optical quantum type detector is utilized to detect the radiation emitted from a heated article. In the environment to be detected, the energy reflected from the surface of the heated article through which the radiation is emitted from the outdoor under the room temperature should be considered. The radiation intensity (P) to be detected can be represented as follows:

$$P = \epsilon E_b + (1-\epsilon) S_a \quad (A)$$

in which $S_a$ is the radiation intensity under the room temperature and $\epsilon$ is the thermal radiation emissivity, in which the emissivity is defined as follows:

$$\varepsilon = \frac{I(T, v)}{E_b(T, v)} \quad (B)$$

in which I (T, v) is the energy emitted from the heated article under temperature T for the radiation frequency v and $E_b$ (T, v) is the energy emitted from the blackbody under temperature T for the radiation frequency v. Every thermal radiometer should be corrected by means of blackbody radiation. A diagram illustrating the blackbody radiation intensity as a function of temperature for different wavelengths by utilizing a thermal radiometer is shown in FIG. 8. As obtained from the above, the temperature at the position of the zone of solid-melt-gas interface is the melting point of the material. A thermal radiometer is utilized to measure the radiation intensity at that point for the wavelength of 10.6 μm. The blackbody intensity at the corresponding temperature is obtained by referring to FIG. 8. The known blackbody intensity is then substituted into Equation (B) to obtain the magnitude of the emissivity at the melting point. Since the normal emissivity for such wavelengths is relatively insensitive to the variation of surface temperature, the distribution of the surface temperature in the whole solid and melt zones can thus be obtained according to Planck's law. FIG. 9 is a diagram showing the distribution of surface temperature of the LiNbO₃ polycrystalline rod in an axial direction, and the temperature gradient thereof as a function of reference laser power.

Effects

It is not necessarily the intention of the present invention to detect the optical property of material. The present invention directly measures the surface radiation phenomenon and converts it to the emissivity at the melting point to calculate the distribution of the surface temperature of the material. It follows that the present invention is directed to non-contact measurement and therefore requires no additional light source and receiver. The detection according to the present invention completely depends upon the emitted radiation of the receiving material itself, thereby reducing measurement error and accelerating the analysis process.

The above description is made with respect to the preferred embodiments of the present invention. It is possible for those skilled in the art to make a variety of modifications and changes without departing from the scope and spirit of the present invention. All these modifications and changes should be considered within the scope of the present invention as defined in the appended claims.

What is claimed is:

1. A non-contact method for measuring a surface temperature distribution of a melt during growth of ionic crystals, in which an ionic crystal comprises a long-wavelength absorption edge and a Reststrahlen band having high reflectance, and wherein the crystal has an opaque spectral region having low reflectance and high absorption in a range between the long-wavelength absorption edge and the onset of the Reststrahlen band; the non-contact method for measuring surface temperature of ionic crystals comprising:

a. melting the ionic crystal to form a solid coexistent with said melt;

b. receiving a thermal radiation intensity distribution emitted from a surface of the ionic crystal to be measured, said received radiation being within said opaque spectral region;

c. obtaining a surface thermal radiation intensity within said opaque region at a solid-melt-gas interface of the ionic crystal at a predetermined temperature of a melting point thereof and dividing said obtained intensity by a blackbody radiation intensity at a same temperature to obtain an emissivity at the melting point; and d. converting the received surface thermal radiation intensity to a surface temperature distribution of the ionic crystal from the derived emissivity.

2. The non-contact method according to claim 1, wherein the ionic crystal further comprises a short-wavelength absorption edge and has a transparent spectral region having low reflectance and low absorption in the spectrum between the short-wavelength absorption edge and the long-wavelength absorption edge.

3. The non-contact method of claim 1, wherein the step of receiving further comprises continuously receiving the surface thermal radiation by means of a thermal radiometer.

4. The non-contact method according to claim 2, wherein the step of melting further comprises forming a solid-melt-gas interface at which a maximum radiation intensity in an axial direction of the crystal is located, said maximum radiation intensity being within said transparent spectral region.

5. The non-contact method according to claim 1, wherein the solid-melt-gas interface is located by analyzing a zone shape.

6. The non-contact method according to claim 5, wherein the zone shape is determined by obtaining differences between the radiation intensity of the ionic crystal to be measured and circumferential environment.

7. The non-contact method according to claim 3, wherein the step of obtaining thermal radiation intensity at the melting point includes recording the thermal radiation intensity at the melting point received from the thermal radiometer within a specific time period.

8. The non-contact method according to claim 1, wherein the blackbody radiation intensity is a calibrated radiation intensity corresponding to the predetermined temperature of the melting point.

9. The non-contact method according to claim 7, wherein the blackbody radiation intensity is a calibrated radiation intensity corresponding to the predetermined temperature of the melting point.

* * * * *

UNITED STATES PATENT AND TRADEMARK OFFICE
CERTIFICATE OF CORRECTION

PATENT NO. : 6,074,087

DATED : JUNE 13, 2000

INVENTOR(S) : CHEN ET AL.

It is certified that error appears in the above-identified patent and that said Letters Patent is hereby corrected as shown below:

On the title page, item:

[73] Assignee: "Security" should read --Science--

Signed and Sealed this

Thirty-first Day of October, 2000

Attest:

Q. TODD DICKINSON

*Attesting Officer*      *Director of Patents and Trademarks*